(12) United States Patent
Mitchell et al.

(10) Patent No.: US 8,564,653 B2
(45) Date of Patent: Oct. 22, 2013

(54) SCALEABLE, COMPACT, HIGH RESOLUTION OPTICAL FINGERPRINT READER

(75) Inventors: Joseph N. Mitchell, San Antonio, TX (US); Michael J. McFadden, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 491 days.

(21) Appl. No.: 12/906,103

(22) Filed: Oct. 17, 2010

(65) Prior Publication Data

US 2012/0092474 A1    Apr. 19, 2012

(51) Int. Cl.
    *H04N 7/18* (2006.01)
(52) U.S. Cl.
    USPC ............................................................ 348/77
(58) Field of Classification Search
    USPC .................................. 348/77; 382/124; 396/15
    See application file for complete search history.

(56) References Cited

U.S. PATENT DOCUMENTS

| 5,448,649 A | 9/1995 | Chen et al. |
| 5,548,394 A * | 8/1996 | Giles et al. ...................... 356/71 |
| 5,732,148 A * | 3/1998 | Keagy et al. .................. 382/124 |
| 5,920,384 A * | 7/1999 | Borza ............................. 356/71 |
| 6,750,955 B1 * | 6/2004 | Feng ................................ 356/71 |
| 7,110,496 B1 * | 9/2006 | Amiton et al. ............. 378/98.12 |
| 2005/0117784 A1 * | 6/2005 | Merbach et al. ............. 382/124 |
| 2006/0104492 A1 * | 5/2006 | Maase et al. .................. 382/124 |

\* cited by examiner

*Primary Examiner* — Mehrdad Dastouri
*Assistant Examiner* — Mohammed Rahaman
(74) *Attorney, Agent, or Firm* — Chowdhury & Georgakis, P.C.; Ann C. Livingston (57) ABSTRACT

A fingerprint reader for acquiring a fingerprint image has a platen with a micro prism sheet on its underside. An arrangement of fold mirrors is used to receive light from the platen and fold the optical path twice before reaching the imagers. The reader has multiple imagers, each imager having at least an imaging lens and an image sensor. Each imager is configured so that the image plane of the image sensor is tilted relative to the optical axis of the imaging lens, such that keystone distortion in the fingerprint image is corrected.

5 Claims, 7 Drawing Sheets

SCALEABLE, COMPACT, HIGH RESOLUTION OPTICAL FINGERPRINT READER

GOVERNMENT SUPPORT CLAUSE

This invention was made with government support under Contract No. N00178-08-D-3007, Task Order/PO #0003, awarded by the Naval Surface Warfare Center, and under Contract No. HSHQDC-10-C-00069, awarded by the Department of Homeland Security. The government has certain rights in the invention.

TECHNICAL FIELD OF THE INVENTION

This invention relates to optical fingerprint readers, and more particularly to prism-based optical fingerprint readers.

BACKGROUND OF THE INVENTION

A fingerprint reader's basic job is to acquire an image of a fingertip so that it can be determined whether the pattern of ridges and valleys in the image matches a pattern in a database of stored images. The two most common technologies for imaging a fingerprint are optical scanning and capacitance scanning. Another more recently developed technology uses an ultrasonic sensor.

One common configuration of an optical fingerprint reader uses a right-angled prism, a light source, a lens group, and an image sensor, such as a CCD device. When a fingertip is on the contact surface (a flat side of the prism), its ridges are pressed onto the surface while its valleys are spaced from it. Light from the light source reaches the contact surface after passing through the prism. If the light reaches a valley, total internal reflection causes all the light to reach the image sensor after passing through the lenses. On the other hand, if the light reaches ridges pushed onto the surface, some light reaches to the image sensor and some light is absorbed in the ridges. Changes in luminous intensity between light reflected from valleys and light reflected from ridges are calculated by the image sensor to obtain the fingerprint image. In short, optical prism-based fingerprint readers rely on the fact that fingerprint ridges placed on the contact surface disrupt the prism's total internal reflection, enabling high contrast fingerprint imagery.

Prism-based fingerprint readers can use either a bulk-prism or a micro-prism sheet. Using a micro-prism sheet reduces the sensor's size, weight, and cost while increasing its robustness and manufacturability. An example of a fingerprint reader implemented with a micro-prism sheet is described in U.S. Pat. No. 5,448,649.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

As indicated in the Background, by proper use of the phenomenon of total internal reflection as applied to a prism, the ridge-valley patterns of a fingerprint can produce a high contrast fingerprint image. This is true because light is absorbed where the prism is contacted by the ridges of the finger and reflected where there is no contact.

The following description is directed to various improvements to prism-based optical fingerprint readers. A fingerprint reader embodying these improvements is described herein. This improved reader reduces the effect of keystone distortion by tilting the plane of the image sensor with respect to the imaging lens. Also, the reader has an array of imagers to increase image resolution and scalability and to make the reader more compact. Finally, its platen is inscribed with fiducial marks to simplify image stitching and correction. Any one of these features can be incorporated into a fingerprint reader, or they can be incorporated in combination.

Figure 1:
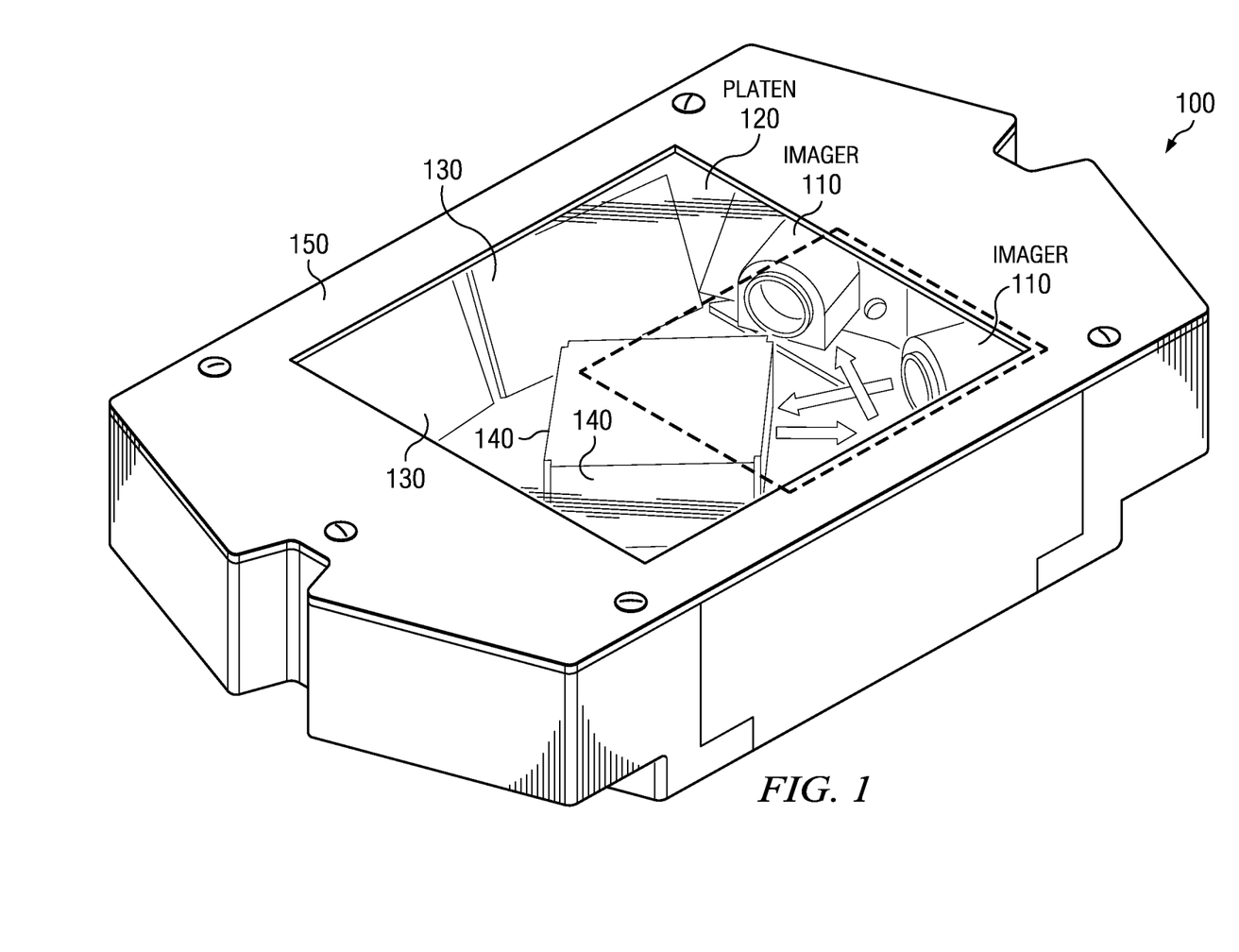
FIG. 1 is a perspective view of an example embodiment of the fingerprint reader.

FIG. 1 is a perspective view of an example embodiment of a fingerprint reader 100. The reader 100 in packaged in a housing 150. In this example embodiment, the housing 150 is generally rectangular and has outer dimensions of approximately 6×4×1.5 inches. However, other closed shapes and sizes may be used.

A transparent micro-prism platen 120 at the top of the housing 150 provides the surface upon which one or more of a subject's fingertips are placed for imaging. Reader 100 is suitable for single, four-slap and/or rolled fingerprints.

Four imagers 110, two at each end, each view an associated quadrant of the platen 120. In FIG. 1, only two imagers 110 at one end of the reader 100 are visible. Each of the four imagers 110 images a separate quadrant, using relatively long focal length lenses. This minimizes the package volume and reduces distortion. The same concept can be applied to other numbers of multiple imagers, with each having an associated optical path and imaging region on the platen.

Imagers 110 may be any one of various imaging devices, with an example of a suitable type of imaging device being one having a CCD or CMOS sensor and appropriate lenses. As explained below, the sensor device is typically mounted on flat circuit board. The image device detects an image on its "image plane".

In the example of FIG. 1, the optical path associated with each imager 110 has one side fold mirror and one center fold mirror. Side fold mirrors 130 mounted along each side of reader 100, and center fold mirrors 140, fold the optical path of each imager 110 twice. Each mirror has a compound tilt to direct the optical path from the platen 120 to the imager 110 in a compact fashion. Side fold mirrors 130 are against opposing sides of the housing 150 and are tilted at an appropriate angle to receive light transmitted from the platen 120. Center fold mirrors 140 are mounted in the center of the bottom of housing 150.

Other embodiments of reader 100 can have different fold mirror configurations adjacent to or beneath the platen 120. Reader 100 could be designed to have one or two fold mirrors per optical path, or even none. The benefit of using one or more fold mirrors is that they allow for an increased optical path length in a reduced volume. This increased optical path length allows for a longer focal length lens, which reduces both keystone distortion and a compression effect.

For example, another fold mirror configuration could use a single longer fold mirror along each side with a compound tilt center fold mirror. Alternatively, a first fold mirror could be flush with the package base, while a compound tilt second fold mirror could steer the reflected light from the platen to the imager. An alternative example fold mirror configuration is described below in connection with FIGS. 9A and 9B.

Each imager 110 of this description is configured so that the image plane detected by its sensor device can be tilted related to the optical axis of its imaging lens(es). This reduces keystone distortion resulting from the oblique viewing angle, and improves resolution uniformity across the platen. Alternatively, the sensor device can be shifted laterally relative to the optical axis of its imaging lens(es).

Figure 2:
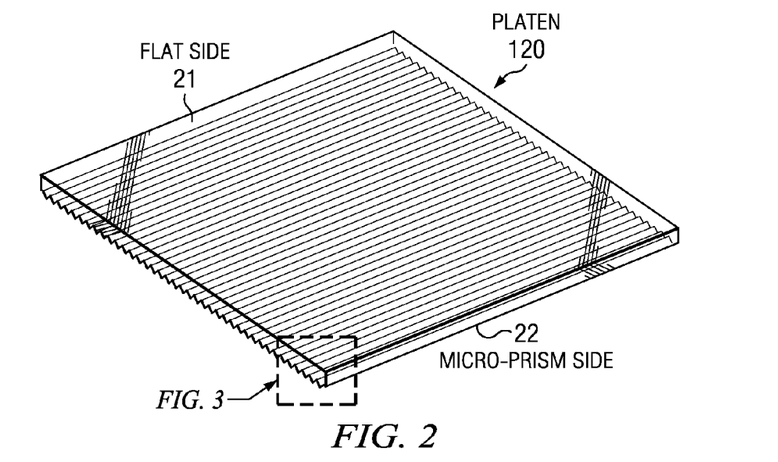
FIG. 2 illustrates the platen in further detail.
Figure 3:
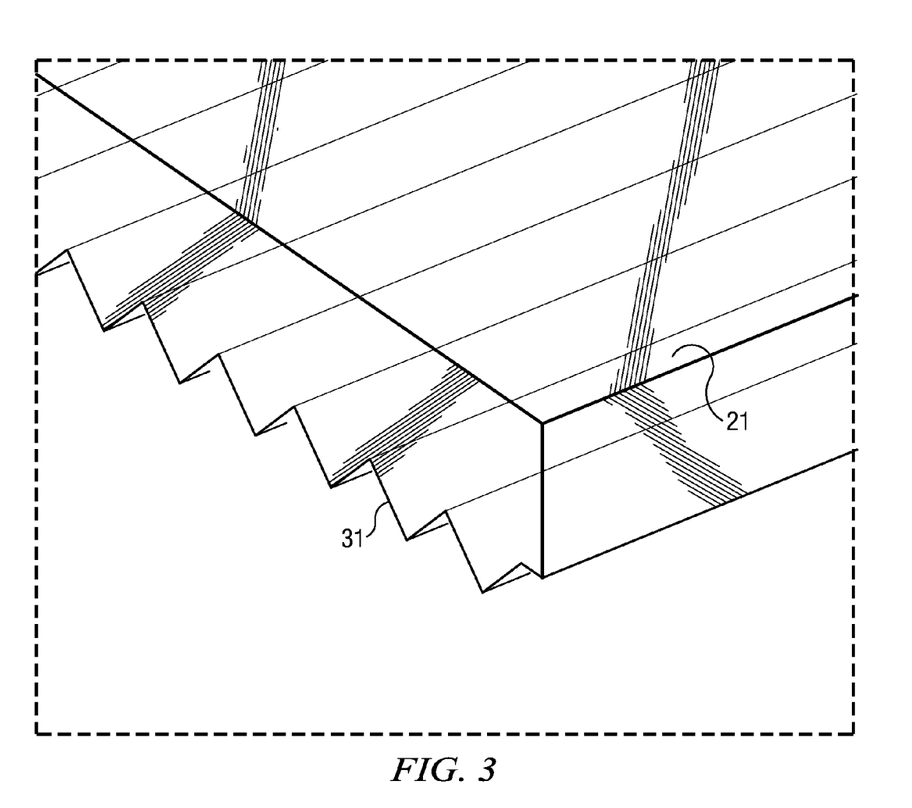
FIG. 3 illustrates a portion of the underside of the platen.

FIGS. 2 and 3 illustrate platen 120 in further detail, with FIG. 3 being a portion of the underside of the platen. The subject's finger (or fingers) is placed on the flat contact side 21 of the platen 120. A typical thickness of contact side 21 is 0.1 inch.

The underside of platen 120 is a micro prism sheet 22. Each micro prism 31 is a strip whose cross section is an isosceles triangle. In the example of FIGS. 2 and 3, each micro prism's cross section also has a right angle, but this is not necessary. The pitch of the micro prisms 31 is much smaller than the width of a ridge or valley of a fingerprint, with typical pitch dimensions being less than 50 micrometers. In the example of FIG. 3, the pitch is 0.10 inches.

Referring again to FIG. 1, the wide arrows indicate the optical path from one of the imagers 110 to platen 120. The dashed lines indicate the field of view of one imager 110.

As indicated, to isolate the fingerprint ridges and achieve high contrast, platen 120 is viewed by imagers 110 at an oblique angle. This introduces two major sources of distortion to the image that reduce its native resolution. The first source, common to prism-based fingerprint imaging sensors, results from the fact that the platen's object plane is tilted relative to the imager, causing a perspective effect often called "keystone" distortion due to the distinctive shape of the resulting image.

Figure 4:
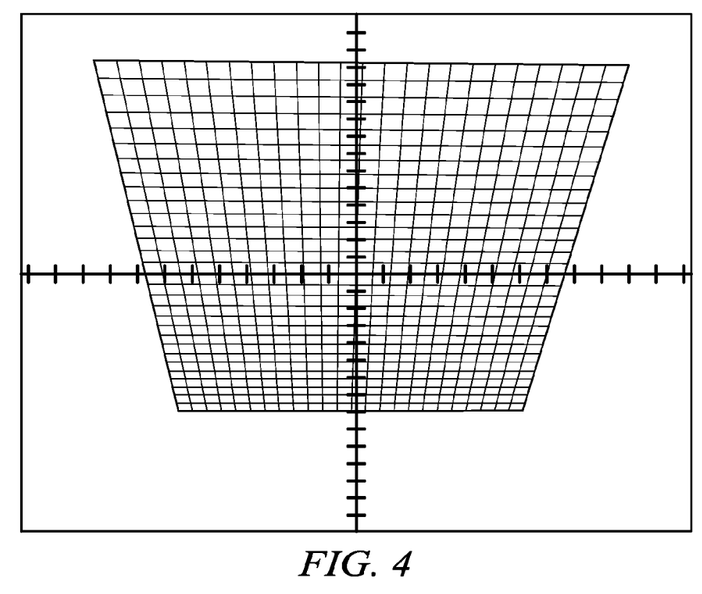
FIGS. 4 and 5 illustrate uncorrected and corrected keystone distortion, respectively.
Figure 5:
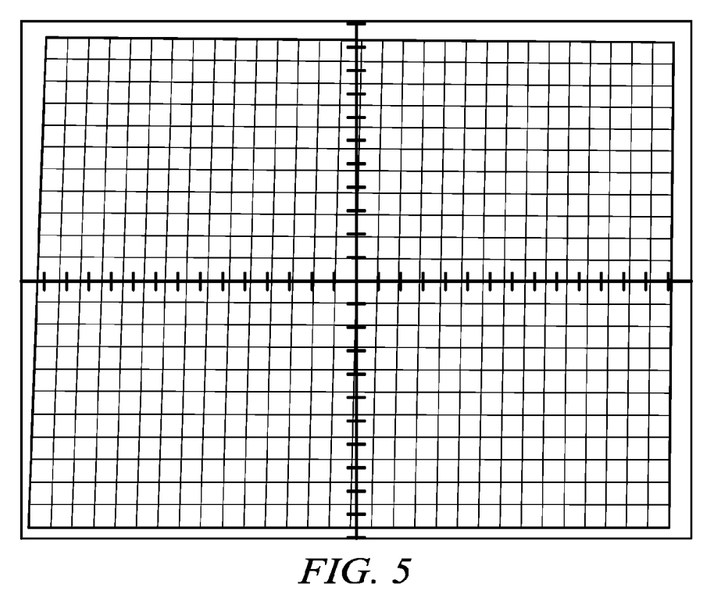

FIGS. 4 and 5 illustrate uncorrected and corrected keystone distortion, respectively. Fingerprint reader 100 achieves the corrected distortion by tilting the sensor's image plane relative to the imaging lens so that the object and image planes are closer to parallel. Even severe keystone distortion can be almost completely eliminated by this configuration.

Figure 6:
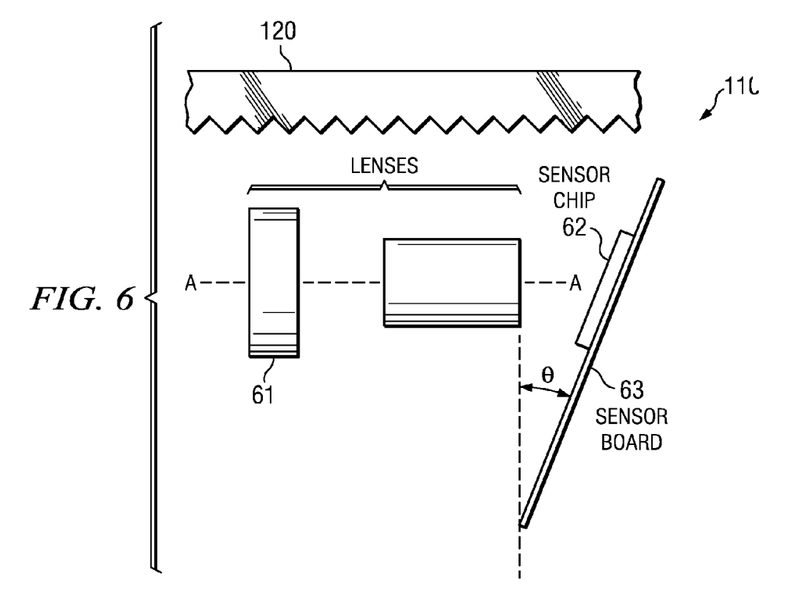
FIG. 6 is a longitudinal section view of one of the four imagers, showing the tilt of the image plane of its image sensor relative to its imaging lens.

FIG. 6 is a longitudinal section view of one of the four imagers 110, showing the "internal" tilt of the image plane of the image sensor 62 relative to the imaging lens 61. The imaging lens 61 has an optical axis A-A that is substantially parallel to the platen 120. The image sensor 62 (such as a CCD chip), typically mounted on a sensor board 63, has an image plane that receives light from the platen 120 via the optical path described above. This image plane is tilted so that it is offset from being normal to the optical axis of imaging lens 61. A typical offset angle, $\theta$, is 30-40 degrees, but this angle may be adjusted to obtain the desired distortion correction.

The method illustrated in FIG. 6, of tilting the image plane relative to the optical axis of the imaging lens, could be applied to other types of optical fingerprint readers. For example, in a conventional fingerprint reader having only one imager, the imager's image plane could be tilted. Also, the imager of FIG. 6 could be used as an imager for a fingerprint reader having a bulk right-angled prism (instead of a micro prism sheet), as a method of correcting keystone distortion for that type of reader.

Figure 7:
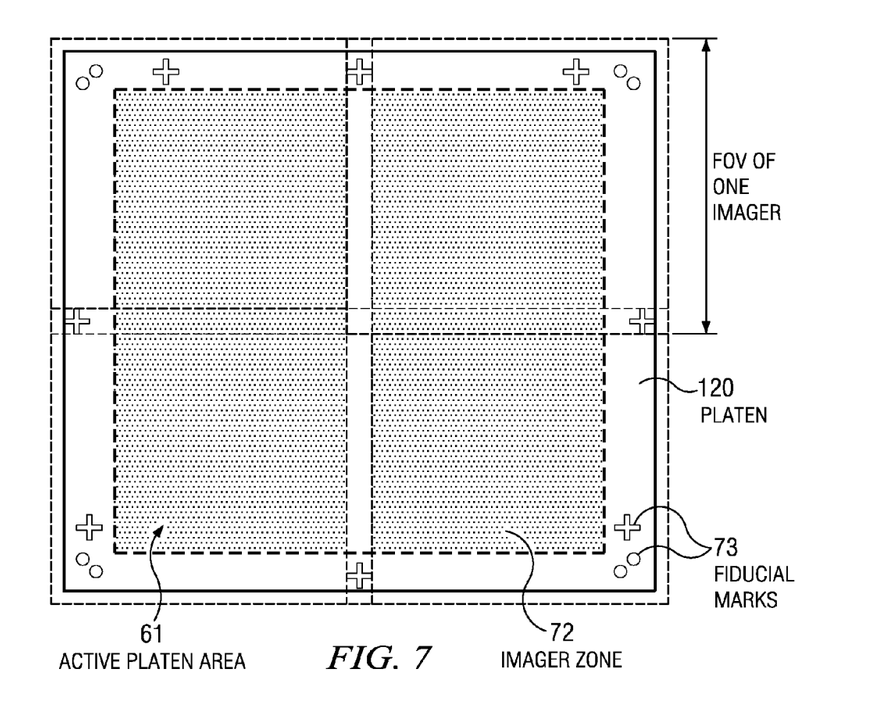
FIG. 7 is a top view of the platen, and also illustrates the viewing zones of the imagers.

FIG. 7 is a top view of platen 120, and also illustrates the viewing zones of the imagers 110. Referring to both FIGS. 1 and 7, reader 100 uses multiple imagers 110 to subdivide the platen 120 into multiple image zones. In the embodiment of FIGS. 1 and 7, sensor has four image zones 72. Each imager 110 views a separate portion of the larger platen 120.

With multiple imagers 110, the focal lengths of each imager 110 can be relatively long, which reduces distortion, compared to a single imager the covers the same size platen 120. Each imager 110 images a different zone of the platen, and the images are stitched together in software. The four fields of view of the imagers 110 (the zones) are slightly overlapping.

Using multiple imagers increases the total number of samples of the platen and reduces distortion, while also reducing sensor package dimensions. In addition, the module becomes highly scalable, making larger platens or higher resolutions possible.

FIG. 6 also illustrates fiducial marks 73 inscribed on the underside of the platen. The "active" platen area 61 is the area used to acquire the actual image. The fiducials 63 are outside the active platen area 61, and facilitate calibration, simplify image stitching, and aid in distortion correction.

The fields of view of the array of imaging sensors extend slightly beyond the edge of the platen active area so that multiple fiducials are visible to each zone imager. Because the fiducial marks 73 for all zones are inscribed on the same component (the platen 120), their relative positions will be fixed with respect to each other, and the relationship between the fields of view of all imagers will be known. This method allows for correction of small positioning variations arising during manufacturing and will enable automatic re-calibration prior to each fingerprint capture to account for variations and misalignments due to thermal expansion or rough handling of the fingerprint module.

Figure 8:
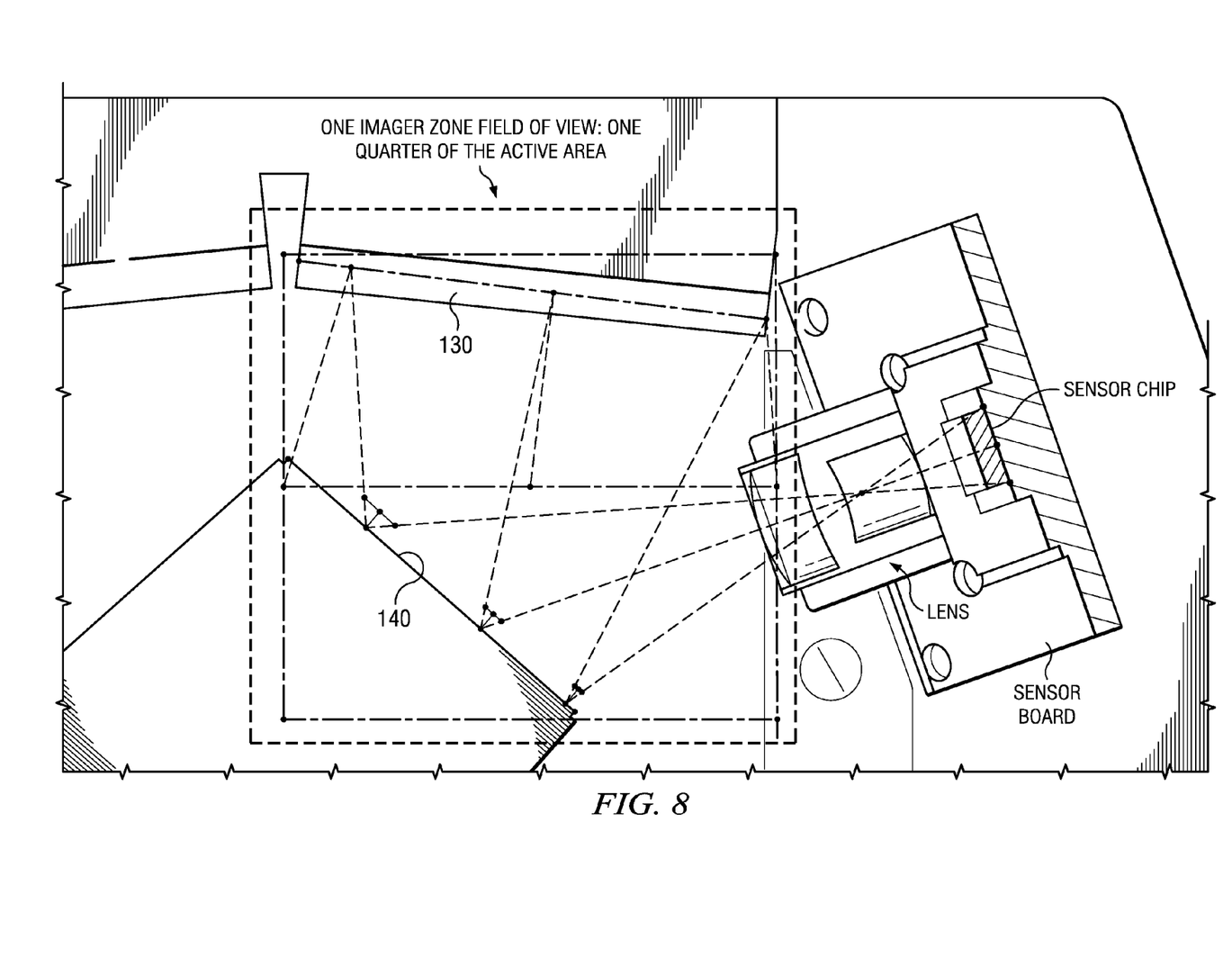
FIG. 8 is a top view (through the platen) of a portion of the fingerprint reader, illustrating the field of view (one zone) of one imager.

FIG. 8 is a top view (through the platen) of a portion of fingerprint reader 100, illustrating the field of view (one zone) of one imager 110. As explained above for this embodiment, the optical path of each imager 110 is folded twice, to achieve the effect of viewing the platen 120 from an oblique angle. Dashed lines indicate the optical ray paths though the fold mirrors 130 and 140. Other arrangements of the optical path with different numbers and orientations of mirrors can also provide an oblique viewing angle of the platen 120.

The method illustrated in FIG. 8, of dividing the platen into viewing portions and using multiple imagers, each of which view an associated portion of the platen, could be applied to other prism-based fingerprint readers. For example, a fingerprint reader having a bulk prism could be configured to have multiple sensors (instead of a single imager) to improve resolution.

Figure 9A:
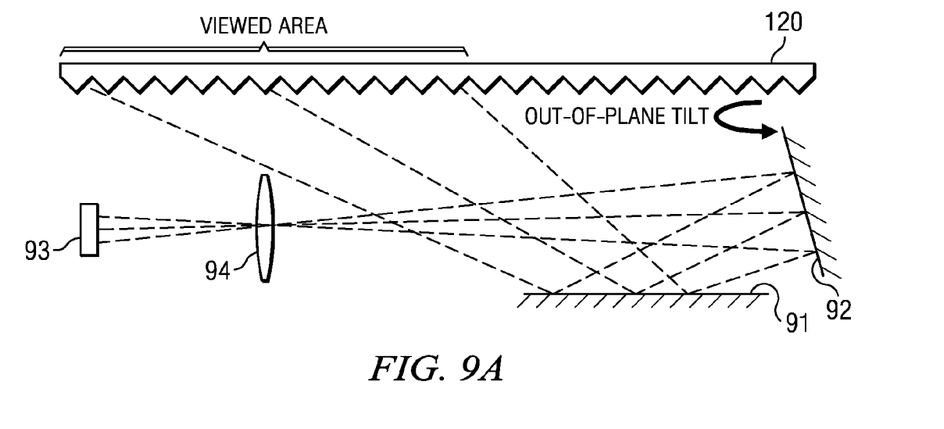
FIGS. 9A and 9B are a side view and top view, respectively, of an alternative fold mirror configuration.
Figure 9B:
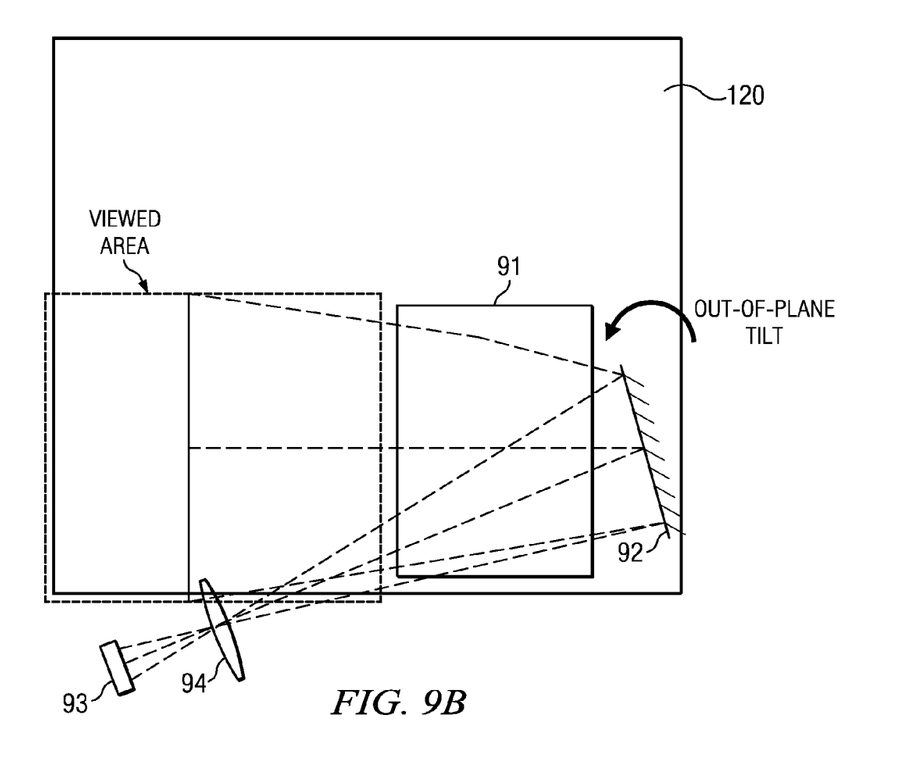

FIGS. 9A and 9B are a side view and top view, respectively, of an alternative fold mirror configuration. The optical path for one imager, represented with its sensor 93 and a lens 94, is shown together with the associated viewing area on the platen 120. Light from the platen 120 is reflected from a first fold mirror 91, and then directed to a second fold mirror 92, and to the lens 94 and sensor 93. The figures imply a set of four imagers, but this method of folding the optical path could be applied to a reader with some other number of imagers.

Figure 10:
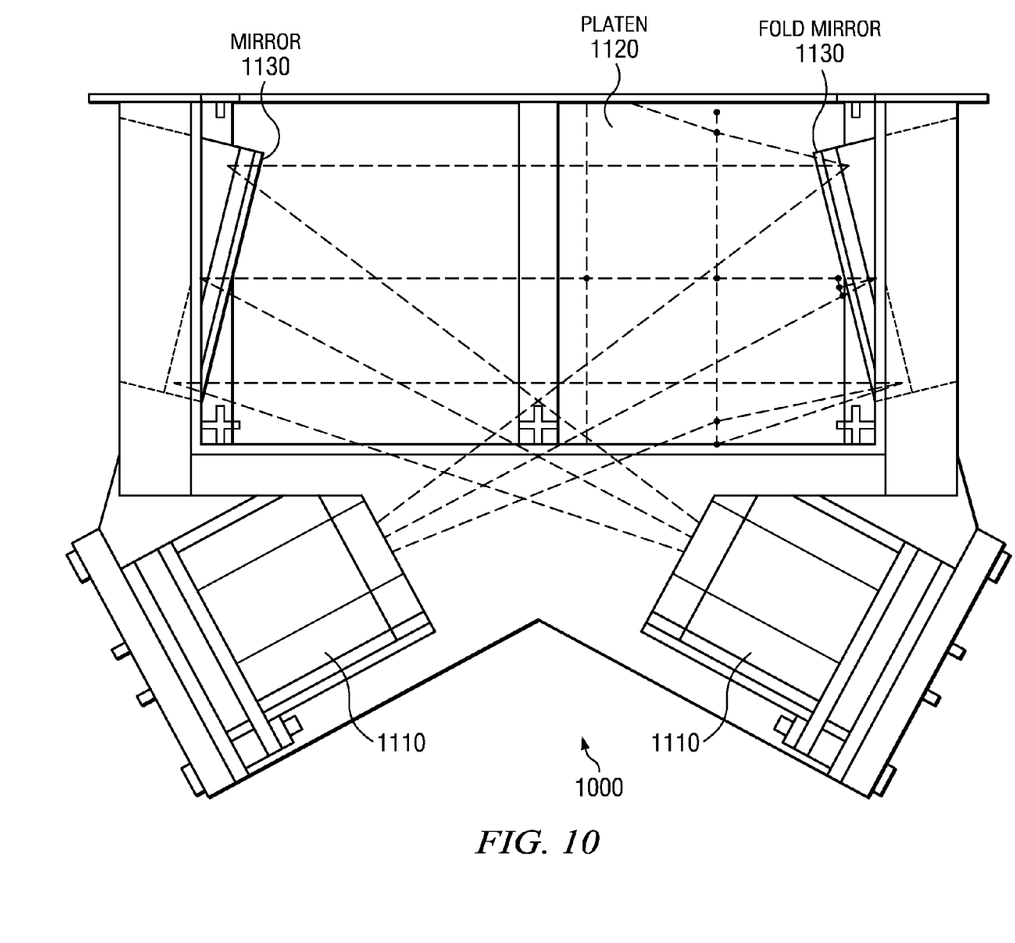
FIG. 10 illustrates another alternative fold mirror configuration.

FIG. 10 is a top view of a reader 1000 with another fold mirror configuration, looking down through the platen. Two of four imagers 1110 and one half of the platen 1120 are illustrated, thus one half of the optical path pattern is shown. The other half of reader 1000 is a mirror image of what is explicitly illustrated.

In reader 1000, the imager 1110 on the lower right images the left side of the platen; the imager 1110 on the lower left images the right side of the platen. The fold mirrors 1130 (one per imager) are configured so that the optical paths cross beneath the platen. This configuration facilitates reduction of the overall size of the reader and increased optical resolution near the center of the platen.

What is claimed is:

1. A fingerprint reader for acquiring a fingerprint image, comprising:
    a housing, generally open at the top, and having two sides, two ends, and a bottom;
    wherein the interior of the housing forms a generally rectangular interior volume for containing four separate optical paths;
    a transparent platen that fills the top of the housing where the top of the housing is open;
    wherein the platen has a flat side facing out of the housing and a micro prism sheet side facing into the housing;
    a set of four center fold mirrors in the center of the interior volume of the housing;
    wherein each center fold mirror directs light in a different direction and toward a different corner of the interior volume of the housing;
    a plurality of perimeter fold mirrors along the perimeter of the interior volume of the housing;
    a set of four imagers, wherein two imagers are located at a first end of the interior volume and two imagers are located at an opposing end of the interior volume, the imagers configured such that each imager receives light from an associated quadrant of the platen;
    wherein each imager is configured to receive light from a quadrant of the platen via an associated center fold mirror and an associated perimeter fold mirror;
    wherein each imager has at least an imaging lens and a image sensor, the imaging lens having an optical axis and the image sensor operable to detect light incident on an image plane.

2. The fingerprint reader of claim 1, wherein each imager is configured so that the image plane of each image sensor is tilted relative to the optical axis of the imaging lens, such that keystone distortion in the fingerprint image is reduced.

3. The fingerprint reader of claim 1, wherein each imager receives a sub-image that overlaps the sub-image of one or more of the other imagers.

4. The fingerprint reader of claim 1, wherein the platen is inscribed with fiducial marks outside the active area.

5. The fingerprint reader of claim 4, wherein each imager receives light from a fiducial mark that is also viewed by at least one other imager.

* * * * *